United States Patent [19]

Savin

[11] Patent Number: 5,792,803
[45] Date of Patent: *Aug. 11, 1998

[54] CATHODIC COATING COMPOSITIONS COMPRISING LIGHTWEIGHT HOLLOW GLASS MICROSPHERES AND ZINC POWDER

[75] Inventor: Ronald R. Savin, 11001 Muirfield Dr., Rancho Mirage, Calif. 92270

[73] Assignee: Ronald R. Savin, Rancho Mirage, Calif.

[*] Notice: The term of this patent shall not extend beyond the expiration date of Pat. No. 5,580,907.

[21] Appl. No.: 774,252

[22] Filed: Nov. 26, 1996

Related U.S. Application Data

[63] Continuation of Ser. No. 505,167, filed as PCT/US95/01475 Feb. 3, 1995, Pat. No. 5,580,907, which is a continuation-in-part of Ser. No. 287,913, Aug. 9, 1994, Pat. No. 5,413,628.

[51] Int. Cl.$^6$ ............................................. C08J 9/32
[52] U.S. Cl. ............................................. 523/219
[58] Field of Search ............................................. 523/219

[56] References Cited

U.S. PATENT DOCUMENTS

| | | |
|---|---|---|
| 3,998,771 | 12/1976 | Feneis, Jr. et al. . |
| 4,417,007 | 11/1983 | Salensky et al. . |
| 4,621,024 | 11/1986 | Wright . |
| 4,748,194 | 5/1988 | Geeck . |
| 4,891,394 | 1/1990 | Savin . |
| 5,098,938 | 3/1992 | Savin . |
| 5,167,701 | 12/1992 | Savin . |
| 5,182,318 | 1/1993 | Savin . |
| 5,252,632 | 10/1993 | Savin . |
| 5,334,631 | 8/1994 | Durand . |
| 5,338,348 | 8/1994 | Savin . |
| 5,413,628 | 5/1995 | Savin . |

FOREIGN PATENT DOCUMENTS

| | | |
|---|---|---|
| 2065828 | 10/1992 | Canada . |
| 2074329 | 1/1993 | Canada . |
| 2602239 | 2/1988 | France . |
| 3018765 | 11/1981 | Germany . |
| 24566 | 3/1974 | Japan . |
| 51958 | 3/1984 | Japan . |

*Primary Examiner*—Veronica P. Hoke
*Attorney, Agent, or Firm*—Dinsmore & Shohl LLP

[57] ABSTRACT

A coating composition for use in protecting metallic substrates from corrosion, comprising in weight percent, based on the total weight of the composition; from about 10% to 20% of a film forming substance; from about 45% to 55% of zinc powder, from about 25% to 35% of zinc dust; from about 1.5% to 2.5% of hollow glass microspheres having diameters ranging from 1 to about 150 microns and a true density of 0.3 to 1.1; from about 2% to 15% by weight of the film forming substance, of a hardener, about 1% to 2% by weight of the film forming substance, of an amorphous silica; and about 0.3% to 1% of a flow control agent.

9 Claims, No Drawings

CATHODIC COATING COMPOSITIONS COMPRISING LIGHTWEIGHT HOLLOW GLASS MICROSPHERES AND ZINC POWDER

This is a continuation of application Ser. No. 08/505,167, filed Aug. 14, 1995 now U.S. Pat. No. 5,580,907, which PCT/US95/01475 filed Feb. 3, 1995, which is a continuation-in-part of Ser. No. 08/287,913 filed Aug. 9, 1994 (now U.S. Pat. No. 5,413,628).

FIELD OF THE INVENTION

This invention relates generally to organic solvent-based, water-borne and powder, coating compositions. Particularly, this invention relates to an improvement coating composition which provides enhanced resistance to environmental attack of metallic substrates and which can be applied by any conventional coating technique. More particularly, this invention relates to a coating composition comprising zinc-powder (as defined herein) and lightweight, hollow, glass microspheres dispersed uniformly throughout the thickness of the coating which satisfies the objects set forth herein. The coatings deposited by the composition of the invention are highly electrically conductive and highly cathodic when applied over a ferrous metal substrate, and can be recoated with any topcoat at any time.

BACKGROUND OF THE INVENTION

The outstanding corrosion resistance afforded by galvanizing has made it the most effective means for the long term protection of steel from oxidation (rusting) and subsequent corrosion. It is the conventional method of providing protection for guardrails, transmission towers, light poles, electrical equipment and dozens of other specific applications. Five mils or 125 microns of a galvanizing composition (applied to light poles and transmission towers) will protect exposed equipment for a period in excess of 20 years. Guardrails may be coated with an average deposition of 75 microns and provide approximately 10 years of corrosion protection in an average rainfall environment. Galvanizing compositions are applied both by hot dipping and electroplating, in applications where surface coatings do not provide adequate corrosion resistance.

Galvanizing compositions are made from zinc "ingots" and become oxidized only when exposed to the elements. The high conductivity of galvanizing compositions provides excellent cathodic protection to steel (which acts as the cathode, zinc being the anode), when exposed to a saline environment or other forms of oxidation caused primarily by water in its various forms, moisture, vapor and ice. Zinc-rich primers have been considered to be optimum anti-corrosion coatings on iron or steel substrates.

However, certain problems have restricted their use as industrial type primers. The action of zinc in inhibiting rust is based on an electrochemical interaction between the zinc and the steel substrate. In order not to insulate the zinc particles from each other and from the substrate the prior art has considered it necessary to use very little binder, with satisfactory corrosion protection achieved only when the zinc to binder ratio is at least about 9:1. The high zinc level and the relatively high density of zinc often cause undesirable settling during short term storage. Hence, the zinc is often added just prior to application and mixed rapidly during application to prevent settling and clogging of spray equipment. This deters efficient field use.

A lower zinc content is disclosed in U.S. Pat. No. 3,998,771, issued December, 1976 to T. J. Feneis, Jr. et al. Water-based coating compositions are disclosed for application on iron supports to obtain anti-corrosive coatings. Single phase compositions in this patent include about 2% to 10% by weight of a non-volatile liquid epoxy resin, with low viscosity, derived from bisphenol A and an epihalohydrin, e.g., epichlorohydrin; about 2% to 10% by weight of a modified polyamide, i.e., an addition product of a water soluble polyamide and a liquid epoxy resin; and about 55% to 70% by weight of a zinc pigment having an average particle size of about 2 to 15 microns.

U.S. Pat. No. 4,417,007, issued November 1983 to G. A. Salensky et al, discloses a one component composition containing from about 4% to 25% by weight epoxy or phenoxy resin binder and a polyamine hardener, about 43% to 90% by weight zinc dust, about 3% to 38% by weight $Mn_3O_4$ fume pigment, up to 35% by weight additional pigments including pigment extenders and fillers (such as talc, clays, diatomaceous silica and silica), up to 5% by weight pigment suspension agent (such as hydrous magnesium silicate and lecithin), and balance organic solvents. A 1:1 volume ratio of zinc dust to $Mn_3O_4$ is preferred.

U.S. Pat. No. 4,891,394, issued January 1990 to the applicant of the present invention, discloses a coating composition for the protection of metallic and non-metallic substrates against environmental attack, comprising about 10% to about 25% by weight of a film-forming polymer which may be epoxy resins having an epoxide value of about 250 to 2500, vinyl chloride resins copolymerized with polyisocyanates, and/or vinyl chloride resins copolymerized with melamines; about 30% to about 60% by weight particulate metallic zinc; an agent for control of electrical conductive characteristics comprising a crystalline silica having an oil absorption value of less than 20 as measured by ASTM Test D281-84, the volumetric ratio of such agent to the metallic zinc ranging from about 0.7:1 to about 1.25:1; about 2% to about 3% by weight of an agent for control of rheological characteristics comprising a pyrogenic amorphous silica having an average particle size less than about 0.012 micron; and at least one solvent compatible with the polymer.

French patent application 2,602,239, published Feb. 19, 1988 in the name of the applicant of the present invention, discloses a two phase coating composition containing up to 70% by weight of a powdered metal (based on the total weight of the composition after admixture), from about 2% to 30% of a film-forming polymer, about 2% to about 30% of a hardener for the polymer, at least 1.8% to 30% of an agent for control of Theological characteristics, and up to 30% by weight organic solvents. The preferred polymer is an epoxy resin having an average molecular weight of 350 to 3800. The agent for control of rheological characteristics comprises at least one pyrogenic silica and optionally at least one natural or transformation silica having an oil absorption value preferably not greater than 90 and more preferably not greater than 40. In the specific examples, pyrogenic silicas were used having average particle sizes of about 0.014 micron, about 0.007 micron and about 0.008 micron.

U.S. Pat. No. 4,748,194, issued May 1987 to Geeck, discloses a coating composition for the protection of gas tanks, comprising a powder metal (such as zinc, cadmium, stainless steel, aluminum, alloys or mixtures thereof), a linear epoxy or phenoxy resin having a molecular weight of less than 15,000 cross-linked with a blocked isocyanate, a suspension agent, a thixotropic agent, and "active" and "inactive" organic solvents. The proportion of powdered metal present ranges from 13 to 52 parts per hundred. The suspension agent disclosed in this patent is polyethylene, and the thixotropic agent is silane treated silicon dioxide, in amounts up to 2 parts per hundred.

U.S. Pat. No. 4,621,024, issued Nov. 4, 1986 to F. A. Wright, discloses metal coated microspheres and a process for preparation of the microspheres. Particulate zinc, aluminum, silver, copper, stainless steel, platinum, gold, or mixtures thereof, having an average particle size of about 6 to 10 microns, are bonded to the surfaces of non-conductive microspheres by means of a thermosetting adhesive coating on the microspheres with application of heat, followed by intermittent mixing in the absence of heat. The microspheres may be fly ash, comprising about 80%–96% by weight alumina-silica, with minor amounts of iron oxide, alkaline earth metal oxides and alkali metal oxides. The adhesive binder preferably comprises an organo-functional silane and a copolymerizable monomer. In the final product the metal is from about 15% to about 30% by weight, relative to the weight of the adhesive binder-coated microspheres. Although this patent discloses average particle size diameters of metal coated microspheres ranging from about 60 to 180 microns, the assignee of this patent also produces zinc coated microspheres of smaller average diameters, e.g., about 2.5 to about 60 microns.

The use of zinc-coated microspheres disclosed in the above mentioned U.S. Pat. No. 4,621,024 in zinc-rich inorganic binder compositions has been proposed by the prior art, as a partial replacement for zinc dust. More specifically, substitution of between 20% and 40% by volume of zinc-coated microspheres, for the zinc dust, has been evaluated in a silicate primer (produced by Carboline Company of St. Louis, Missouri, under the trademark "Carbo Zinc 11"). Silicate binders of this type have a very slow drying time, and also require blast cleaning of the metal substrate prior to deposition of the coating. These coatings are electrically conductive.

U.S. Pat. No. 5,182,318 ("the '318 patent"), by the applicant of the present invention, discloses a coating composition exhibiting improved resistance to corrosion of metallic substrates. The glass microspheres in the '318 patent are coated with zinc and are concentrated primarily at the exposed surface of a dry coating, so as to provide corrosion protection to the substrate. The '318 patent provides suitable conditions (by solvent selection), for the hollow zinc-coated glass microspheres to rise to the surface of the coating, to provide the desired protection to the substrate.

Glass microspheres, not coated with a metal, heretofore have been used primarily in non-paint related uses such as: polymeric panels which form a part of airplanes; syntactic foams, electrical potting compounds, randomes in the aerospace industry; syntactic foams in the hydrospace industry; plastisols, adhesives, polymeric spare parts in the automotive industry; wall repair compounds, caulks, sealants and tape joint compounds in the construction industry; in increasing the velocity of detonation, optimum sensitization and chemical stability of industrial explosives; as part of sporting goods such as tennis rackets, flyfishing lines, bowling balls and golf balls; as trowling mix and putty for the marine market; and other applications.

In all of the above listed uses, some of the characteristics of "non-coated" microspheres which are of greatest significance are: the lightness (weight) and resulting lower composite density; spherical shape; inherent strength because of the sphericity, as compared to other fillers; cost effectiveness due to the lower composite density (cost is even lower for the "non-coated" microspheres compared to the metal-coated microspheres); chemical resistance; excellent moisture resistance; low dielectric constant; low electric conductivity; decreased application and drying time, etc.

Contrary to the above listed uses, U.S. Pat. No. 5,252,632 ("the '632 patent") discloses coating compositions, comprising lightweight, non coated hollow, glass microspheres having high isostatic crush resistance, low specific gravity and low oil absorption, for use as cathodic coatings for prevention of corrosion in metallic substrates; and for use as conductive coatings for attenuation of EMI/RFI interference in electronic components, the conductive coatings being suitable for application on metallic and non-metallic substrates.

Co-pending patent application 07/972,115 abandoned ("the '115 application, a continuation of the '115 application has been filed on Jan. 23, 1995), by the applicant of the present invention, discloses an improved low-cost coating composition for use in non-gloss and low-gloss applications which require high, dry deposition thicknesses, said composition comprising, apart from the film-forming polymer and the volatile components, from about 5 to 30 volume percent of lightweight, hollow, glass microspheres, having diameters ranging from 1 to 150 microns.

As demonstrated by the '632 patent and the '115 application, many of the above properties exhibited by these microspheres could be beneficially used in coatings-related applications. However, manufacturers such as Minnesota Mining (3M) and PQ Corporation, make it clear that their sales of the "non-coated", hollow, glass microspheres in the past 12 years to the coatings industry have been insignificant, at best. The principal reason for this lack of enthusiasm for the lightweight microspheres is that their low specific gravity (specific gravity generally ranges from 0.1 to 0.6), causes the spheres to float to the surface (caking), making commercial exploitation rather difficult, except where this particular property is specifically desired and appropriately exploited, as in the '632 patent.

For a cathodic coating, it is important that the final coating itself be a good conductor (have a conductivity of at most 3 ohms/cm$^2$). Conventional wisdom would therefore point away from using the "non-coated" microspheres in cathodic coatings, because of their low electrical conductivity.

As in the '632 patent and the '115 application, the present invention solves the "lightness of the spheres" problem with the use of (1) appropriate wetting agents; (2) appropriate dispersants; (3) appropriate chemical thickeners; and (4) glass microspheres with specific gravity greater than water. It is believed that the low electrical conductivity problem is overcome by (a) the inherent tendency of the microspheres to occupy a much smaller volume within the coating, as compared to conventional extender pigments and (b) the naturally low oil absorption displayed by the microspheres. It is believed that these two characteristics of the "non-coated" hollow glass microspheres, allow the free movement of metal in a liquid phase between the spheres, thereby not restricting the overall conductivity of the coating.

As discussed above, the use of "non-coated", hollow, glass microspheres, instead of conventional pigments, in conductive coatings, results in unaffected overall electrical conductivity; lower overall specific gravity of the coating; improved tensile strength, flexibility, corrosion resistance, water-vapor impermeability; and lower chances of "mud-cracking".

U.S. Pat. No. 5,098,938, issued March 1992 to R. R. Savin, discloses a coating composition similar to that of the above-mentioned U.S. Pat. No. 4,891,394, wherein an epoxy resin film-forming binder is used, and wherein at least four different size grades of pyrogenic amorphous silicas are present within specified proportions and average particle sizes, together with a crystalline silica having an oil absorption value of less than 20 measured by ASTM Test D281-84.

Canadian Patent 2,065,828 provides a waterborne zinc-rich anticorrosion primer which is based upon the combination of metallic zinc dust with a stable aqueous dispersion of a particular chlorinated addition copolymer. Such primer can be formulated without the need for significant amounts of organic co-solvents. There primers readily cure at ambient temperatures, allow overcoating shortly after drying, and result in films of desirable hardness, resiliency and adhesion both to the substrate and topcoat.

Canadian Patent 2,074,329 relates to an improved powder coating composition comprising (a) a resin, (b) a curing agent and (c) zinc, wherein the zinc is a mixture of (c1) lamellar zinc (zinc flakes) and (c2) zinc dust.

U.S. Pat. No. 5,167,701 issued December 1992 to R. R. Savin discloses a one-package zinc-rich coating composition having an inorganic binder which provides protection of metallic substrates against environmental attack comprises, in volume percent: from about 55% to about 60% of an alkyl silicate solution having a solids content of about 35% to about 45% by weight; about 10% to about 140% zinc dust of at least one different particle size grade; about 0.5% to about 2.5% zinc flakes; about 3% to about 6% particulate ferrophosphate; about 10% to about 17% of a particulate crystalline silica having an oil absorption value of less than 20 measured by ASTM Test D 281-84; about 1% to about 2.5% of at least two different size grades of pyrogenic amorphous silicas having average particle sizes ranging from about 0.007 to about 0.04 micron; about 0.3% to about 0.5% of a wetting agent; and about 7% to about 8% of an anhydrous alcohol solvent.

Zinc powder has been used only rarely in zinc rich coating systems due to its large particle size, heavy sedimentation problems and has been ignored as an acceptable pigment. This application involves the use of zinc powder as a low cost galvanized metal replacement. Its relatively larger particle size permits excellent topcoat adhesion while galvanizing generally requires pre treatment such as acid etching or special wash primers to provide adequate adhesion. Most galvanized metal is normally not coated due to the cost involved in the pre-treatment and the application of a topcoat in field conditions. While the term "zinc powder" has been and continues to be used interchangeably with "zinc dust", as used herein "zinc powder" only means metallic zinc in granular form, which is different from "zinc dust", from "zinc powder" and from "particulate zinc", as these terms have sometimes been used in the prior art. As used herein "zinc powder" also is different from "lamellar zinc" or "zinc flakes", as used in the Canadian Patent 2,074,329.

Coatings made from zinc dust provide only limited protection to bare metal due to its much lower conductivity than zinc metal caused by oxidation during its manufacturing process. In conventional zinc rich paints, the greater the conductivity the greater the area of adjacent bare steel that will be protected by the zinc metal. The level of adjacent bare metal protection is largely proportional to its conductivity measured in ohms/cm$^2$. All galvanizing compositions, prior to exposure, will measure total conductivity of 0.00 ohm/cm$^2$ at 75 micron deposition, whereas zinc rich industrial and maintenance coatings will measure from 1 to several dozen ohms/cm$^2$ at 75 microns based on the percentage of zinc dust and the particle size of the zinc dust utilized. In order to provide adequate cathodic continuity, zinc incorporated in primers customarily contains between 80–95 weight % of zinc dust to the binder including additives. The high percentage of zinc dust provides improved conductivity contributing improved cathodic protection, however, the high density and low binder content causes serious problems in handling and poor substrate adhesion.

Another consideration is that inorganic zinc rich coating compositions are difficult to manufacture and store because of the irreversible curing mechanism triggered by exposure to moisture. Once the zinc dust has been added to a one package zinc primer in the manufacturing process, the moisture curing mechanism is activated. Exposure to a minimum relative humidity of 50% effectively cures these inorganic zinc rich coatings. Any exposure to moisture in the manufacturing or packaging process will destabilize the primer by premature curing, resulting in a product that will gel in the container in about two days. These coatings have therefore been manufactured in inert environments, using nitrogen blankets to prevent moisture contamination. One package longer shelf life zinc primer coatings have been marketed in small volumes, since the nitrogen blanketing equipment necessary to produce such coatings in a stable form, is specialized and expensive.

Despite the sensitivity to moisture, inorganic zinc rich coating compositions have been suggested for topcoating to prevent environmental attack.

U.S. Pat. No. 5,338,348 ("the '348 patent") discloses a coating composition for use in protecting metallic substrates from corrosion, comprising in weight percent, based on the total weight of the composition: from about 7% to 35% of film-forming substance; from about 35% to 55% of zinc powder; from about 5% to 25% of zinc flakes; from about 1% to 5% at least one kind of amorphous silica; and up to about 30% particulate ferrophosphate. No microspheres, zinc or glass, are utilized in the compositions of this invention.

U.S. Pat. No. 5,413,628 (of which this application is a continuation-in-part application), discloses a stable coating composition for use in protecting metallic substrates from corrosion, comprising in weight percent, based on the total weight of the composition: from about 7% to 35% of alkyl silicate as a film forming substance; from about 35% to 55% of zinc powder; from about 5% to 25% of zinc flakes; from about 0.2 to 5% of at least one amorphous silica; and up to about 30% particulate ferrophosphate; wherein the alkyl silicate comprises, in weight percent, based on the weight of the alkyl silicate: from about 5% to 20% of tetraethyl orthosilicate.

As described above, previous patents and patent applications of the applicant of the present invention have made two separate advancements in the field of cathodic coatings: (1) the successful utilization of uncoated glass microspheres in such coatings with the benefits associated with the same and without the potential detriments which had led persons skilled in the art away from utilizing the microspheres; and (2) the successful incorporation of zinc powder (as defined above) by overcoming the sedimentation problems associated therewith. However, never before have zinc powder and uncoated glass microspheres been incorporated together in a composition for a cathodic coating. The reasons for this complete lack of prior art in this respect are clear: (1) the extremely low specific gravity of the microspheres; (2) the low electrical conductivity of the microspheres; and (3) the large particle size and concomitant sedimentation problems associated with zinc powder.

In fact, the light, low electrical conductivity microspheres complement the heavy, high electrical conductivity zinc powder very nicely when combined, yielding compositions with the "best of both worlds", as demonstrated by the present application. Additionally, the low cost microspheres reduce the cost of coating containing zinc powder (which is expensive), again proving to be an excellent "foil" for the zinc powder, when combined. Some of the properties afforded by the microspheres and the zinc powder doubly enhance that property in the combination compositions of the present invention, such as adhesion.

SUMMARY OF THE INVENTION

It is a primary object of the present invention to provide a low-cost cathodic coating composition enhanced corrosion protection properties, comprising "non-coated", hollow glass microspheres and zinc powder.

It is an object of the present invention to provide a zinc-powder based coating composition which overcomes the combined disadvantages of present both inorganic and organic binder compositions in a cost effective manner.

It is a further object of the present invention to provide a cathodic coating composition comprising "non-coated", hollow glass microspheres and zinc powder, wherein said microspheres are not concentrated on the surface of the coating, when dry.

It is also an object of the present invention to provide a cathodic coating composition comprising "non-coated", hollow glass microspheres and zinc powder, wherein said microspheres are dispersed uniformly throughout the thickness of the coating, when dry.

It is yet another object of the present invention to provide a cathodic coating composition which delivers enhanced corrosion protection to metallic substrates susceptible to environmental attack.

It is also an object of the present invention to provide a cathodic coating composition which coating may be described as a good conductor (or which has a minimum conductivity of 3 ohms/cm$^2$).

It is a still further object of the present invention to provide a cathodic coating composition having greatly improved adhesion to metallic substrates as compared to conventional zinc-rich cathodic coatings.

It is another object of the present invention to provide a cathodic coating composition which does not require expensive pre-treatment of the metal substrates prior to application of the coating.

It is also an object of the present invention to provide a cathodic coating composition with enhanced water-vapor impermeability.

It is a primary object of the present invention to provide coating compositions with relatively low overall specific gravity, thus allowing easy fluidization, when used in the form of a powder coating.

To achieve the foregoing and other objects, and in accordance with the present invention as described herein, there is provided a powder coating composition for use in protecting metallic substrates from corrosion, comprising in weight percent, based on the total weight of the composition: from about 10% to 20% of a film forming substance; from about 45% to 55% of zinc powder; from about 25% to 35% of zinc dust; from about 1.5% to 2.5% of hollow glass microspheres having diameters ranging from 1 to about 150 microns and a true density of 0.3 to 1.1; from about 2% to 15% by weight of the film forming substance, of a hardener; from about 1% to 2% by weight of the film forming substance, of an amorphous silica; and from about 0.3% to 1% of a flow control agent.

The following description provides preferred embodiments of this invention, simply by way of illustration, of some of the best modes contemplated for carrying out the invention. As will be realized, the invention is capable of modification in various, obvious aspects all without departing from the invention. Accordingly the description will be regarded as illustrative in nature and not restrictive.

DETAILED DESCRIPTION OF THE INVENTION

The film forming substances of the present invention may be selected from the group consisting of alkyl silicate in substantially anhydrous alkyl alcohol as a solvent, epoxy resins (powder and non-powder) and other well known equivalents thereof including vinyl chloride resins copolymerized with isocyanates, polyurethane resins, polyester resins, oil-modified polyester resins, polymers of acrylic, methacrylic esters and waterborne urethane or an emulsion polymer prepared by the polymerization of monomers selected from the group consisting of acrylic, methacrylic, vinyl or styrenic monomers, and mixtures thereof. Preferably, the composition is volatile-free powder composition and the film forming substance is selected from the group consisting of polyesters, epoxy powders, acrylics, urethanes and mixtures thereof.

In case of a powder coating, the presence of amorphous silica is necessary to reduce sintering during manufacturing or storage. The preferred amount of amorphous silica is 1–2% by weight of the polymeric powder. Amorphous silica may be produced by high temperature hydrolysis of silicon tetrachloride or by transformation of silica in an electric arc. Preferred pyrogenic amorphous silicas include those sold under the trademark "AEROSIL" by Degussa, and under the trademark "CABOSIL" by Cabot Corporation. "AEROSIL" 300 has an average particle size of about 0.007 micron. "AEROSIL" 972 is silane treated and has an average particle size of about 0.018 micron, while "AEROSIL" 974 has an average particle size of 0.008 micron. For a powder coating application, about 2% to 15% by weight of the film forming substance, of a hardener is required. While the example below uses Epicote 147 by Shell Chemicals and B-68 by Huls, B-31 by Huls may also be used to replace Epicote 147. The Epicote 147/B-31 imparts a gloss finish to the final coating, whereas the B-68 reduces the glossiness a little bit by imparting a matt finish to the final coating. For a powder coating, 0.3–1 weight percent of flow control agent is required. BYK 365-P by Byk-Chemie is preferred.

This application involves the use of zinc powder as a low cost galvanized metal replacement. Its relatively larger particle size permits excellent topcoat adhesion while galvanizing generally requires pretreatment such as acid etching or special wash primers to provide adequate adhesion. Most galvanized metal is normally not coated due to the cost involved in the pre-treatment and the application of a topcoat in field conditions.

Zinc powder is available from Purity Zinc Co. and the Zinc Corporation of America (ZCA). ZCA 1213, 1222 and mixtures thereof are preferred. Zinc dust #6 by Purity Zinc is preferred.

The use of "non-coated" lightweight, glass, hollow microspheres having a diameter of 1 to about 150 microns, forms a critical aspect of the present invention. Such microspheres are manufactured by 3M Corporation, by the PQ Corporation, and by Potter Industries Inc., a subsidiary of PQ Corporation.

3M Corp. sells these microspheres under the trademark SCOTCHLITE™. SCOTCHLITE™ microspheres are available in at least eight(8) different size ranges, but those which are most preferred for the practice of this invention are the microspheres that are designated B37/2000 and S60/10,000. The B37's have a true density of 0.37 gms/cc and a true density range of 0.34 to 0.40 gms/cc. They have a bulk density ranging from 0.19 to 0.27 gms/cc. They have a typical isostatic crush resistance of 2000 psi, with the range being from about 1000–3000 psi. The B60's have a true density of 0.60 gms/cc and a true density range of 0.57 to 0.63 gms/cc. They have a bulk density ranging from 0.31 to 0.43 gms/cc. They have a typical isostatic crush resistance of 10,000 psi, with the range being from about 6000–15,000 psi. All of the 8 different size ranges have a surface oil absorption of 31–36 gms oil/100 cc of glass bubbles, when tested in accordance with ASTM D1483.

Potter Industries, an affiliate of the PQ Corporation, sells their hollow glass microspheres under the trademark SPHERICEL™. SPHERICEL™ are available in a single size, entitled 110P8. The 110P8 microspheres are slightly heavier than water (in terms of true density) and have a bulk density of 1.1 gms/cc. They have a crush strength of greater than 10,000 psi. They have surface oil absorption of 43.5 gms oil/100 cc of glass bubbles. As with the SCOTCHLITE™ bubbles, no oil is actually absorbed by the SPHERICEL™ bubbles, the oil absorption values reported, being the amount of oil necessary to wet the surface of the glass.

From about 1.5 to 2.5 weight percent of hollow glass microspheres, based on the total weight of the composition, are essential for the practice of this invention.

Preferably, the film forming substance is an epoxy powder. As is well known, epoxy resins are the reaction product of an epihalohydrin and a polyol. Hardening or crosslinking agents for epoxy resins include at least one compound with an —NH$_2$, —CONH$_2$, —NHR, —CONHR, and/or —COOH functional group, which reacts with the epoxy function. The preparation of epoxy resins and crosslinking reactions are described in U.S. Pat. No. 3,954,693, issued May, 1976 to C. C. Fong, the disclosure of which is incorporated by reference. Epoxy resins suitable for use in the present invention include those produced by Shell Chemical Company under the trademarks "Shell 1123" and "Shell 828", and by Ciba-Geigy Co. under the trademark "488-60 Epoxy". Other equivalent epoxy resins are commercially available.

Also preferably, the epoxy powder has epoxy powder has an epoxide value of between 450 and 500. More preferably, the weight ratio of the total zinc content of the combination to the total of the zinc, the epoxy and the hardener, is at least 0.8. Also preferably, the glass microspheres have a surface oil absorption of less than 50 gms oil per 100 cc of glass bubbles, when tested in accordance with ASTM D1483. More preferably, the oil absorption is between 31 and 36 gms oil per 100cc of glass bubbles. Even more preferably, the true density is between 1.0 and 1.2. Also preferably, the glass microspheres are composed of sodium borosilicate glass and have an isostatic crush resistance of at least 8000 psi as determined by ASTM D1302.

Coatings of the present invention are especially suited for use as cathodic coatings. Zinc powder is the preferred conductive phase used as a "sacrificial anode". Zinc is selected because it has a more negative standard electrode potential than iron, which is the most common substrate. The zinc in the coating is thus anodic with respect to the iron. Thus the transformation of iron into soluble ions, which mechanism is at the heart of the corrosion phenomenon, cannot occur. The zinc corrodes by forming zinc oxide, which in turn further prevents corrosion. The dried film, in order to give effective cathodic protection to steel should contain zinc in a volume, such that the particles are in electrical contact. The microspheres aid in this desired configuration of the zinc particles.

Coatings of the present invention are prepared by mixing together the ingredients listed above or those in the example. Preferably, the lighter ingredients are mixed together prior to the addition of the heavier components. A two screw extruder with the capability to extrude materials of high density is preferred for obtaining optimum even distribution of the raw materials. The extruder used in testing the coatings of the present invention was the MP-PC™ series Powder Coatings Twin Screw Extruder by APV. It is preferred that the zinc powder is fed separately from all the other raw materials. The other raw materials are preferably premixed before feeding them separate from the zinc powder. If separate feeding is used, it is desirable that the two feeders are capable of being controlled so as to add the raw materials in the correct ratio. The post-extrusion powder should ideally have a bulk density of below 2 gms/cc for effective fluidization during electrostatic spraying of the powder. In order to provide optimum electrostatic conductivity during spraying, 0.2 weight percent of aluminum oxide may be added to the post extruded powder. It is important that the powder to be sprayed have a consistent bulk density. Re-extrusion is recommended, if inconsistencies are observed. Partial polymerization of the epoxy resin may be avoided by maintaining a low extrusion temperature. The powder may then be sprayed electrostatically as is well known in the powder coatings industry.

The following specific example is given to illustrate preferred embodiments of compositions of the invention but is not to be construed as a limitation on the invention herein claimed.

EXAMPLE

A single component cathodic powder coating composition was red by mixing the constituents listed below with the microspheres added last. The quantities are in percent by weight based on the total weight:

| | |
|---|---|
| Epoxy powder resin[1] | 15.6 |
| Hollow glass microspheres[2] | 2.0 |
| Zinc dust[3] | 31.5 |
| Hardener[4] | 0.5 |
| Hardener[5] | 0.9 |
| Zinc powder[6] | 48.5 |
| Hydrophobic fumed silica[7] | 0.3 |
| Flow control agent[8] | 0.5 |

[1]Epon 3001 powder by Shell Chemicals
[2]3M Corp, S 60/10,000 SCOTCHLITE™
[3]Zinc dust #6 by Purity Zinc
[4]Huls B-68 by Huls
[5]Epicote 147 by Shell Chemicals
[6]Zinc Corporation of America ZCA 1213
[7]Aerosol 972 by DeGussa
[8]BYK 365-P by Byk Chemie Thus it is apparent that there has been provided, in accordance with the invention, a coating composition comprising zinc powder and uncoated glass microspheres, which fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

What is claimed is:

1. A coating composition for use in protecting metallic substrates from corrosion, comprising in weight percent, based on the total weight of the composition:

from about 10% to 20% of a film forming substance selected from the group consisting of polyesters, epoxy powders, polyacrylics, polyurethanes, vinyl chloride resin copolymerized with isocyanates, and mixtures thereof;

from about 45% to 55% of zinc powder;

from about 25% to 35% of zinc dust; and from about 1.5% to 2.5% of hollow glass microspheres having diameters ranging from 1 to about 150 microns.

2. The composition of claim 1, wherein said polymer is an epoxy powder.

3. The composition of claim 2, wherein said epoxy powder has an epoxide value of between 450 and 500.

4. The composition of claim 1, wherein said glass microspheres have a surface oil absorption of less than 50 gms oil per 100 cc of glass bubbles, when tested in accordance with ASTM D1483.

5. The composition of claim 4, wherein said oil absorption is between 31 and 36 gms oil per 100 cc of glass bubbles.

6. The composition of claim 5, wherein said microspheres have a true density ranging from 0.3 and 1.2.

7. The composition of claim 1, wherein said glass microspheres are composed of sodium borosilicate glass and have an isostatic crush resistance of at least 8000 psi as determined by ASTM D1302.

8. The composition of claim 1, wherein the film forming substance is selected from the group consisting of alkyl silicate in substantially anhydrous alkyl alcohol as a solvent, epoxy resins, vinyl chloride resins copolymerized with isocyanates, polyurethane resins, polyester resins, or an emulsion polymer prepared by the polymerization of monomers selected from the group consisting of at least one acrylic or methacrylic monomer, alone or copolymerized with a vinyl or styrene monomer, and mixtures thereof.

9. A process for manufacturing a coating composition for use in protecting metallic substrates from corrosion, comprising the steps of:

premixing a mixture comprising a film forming substance selected from the group consisting of polyesters, epoxy powders, polyacrylics, polyurethanes, vinyl chloride polymers copolymerized with isocyanate, and mixtures thereof, zinc dust, hollow glass microspheres having diameters ranging from 1 to about 150 microns;

feeding said mixture into a twin screw extruder;

separately feeding zinc powder into said twin screw extruder; and extruding said composition, wherein the composition comprises in weight percent, based on the total weight of the composition: from about 10% to 20% of the film forming substance, from about 45% to 55 % of the zinc powder, from about 25% to 35% of zinc dust, and from about 1.5% to 2.5% of the hollow glass microspheres.

* * * * *